United States Patent
Otto

(10) Patent No.: US 9,137,352 B2
(45) Date of Patent: Sep. 15, 2015

(54) MODULAR ADVANCED COMMUNICATION SYSTEM

(71) Applicant: Kevin L. Otto, Milwaukee, WI (US)

(72) Inventor: Kevin L. Otto, Milwaukee, WI (US)

(*) Notice: Subject to any disclaimer, the term of this patent is extended or adjusted under 35 U.S.C. 154(b) by 0 days.

(21) Appl. No.: 14/255,506

(22) Filed: Apr. 17, 2014

(65) Prior Publication Data
US 2014/0315596 A1    Oct. 23, 2014

Related U.S. Application Data

(60) Provisional application No. 61/813,024, filed on Apr. 17, 2013.

(51) Int. Cl.
*H04M 1/725* (2006.01)
*H04B 1/3877* (2015.01)

(52) U.S. Cl.
CPC ......... *H04M 1/72575* (2013.01); *H04B 1/3877* (2013.01); *H04M 1/72519* (2013.01)

(58) Field of Classification Search
CPC ...................................................... H04N 7/14
See application file for complete search history.

(56) References Cited

U.S. PATENT DOCUMENTS

| | | | |
|---|---|---|---|
| 6,442,240 B1 * | 8/2002 | Otto | 379/37 |
| 7,349,697 B2 * | 3/2008 | Onaka et al. | 455/435.1 |
| 8,364,136 B2 * | 1/2013 | Hoffberg et al. | 455/418 |
| 8,437,689 B2 * | 5/2013 | Mazar | 455/1 |
| 8,473,277 B2 * | 6/2013 | Jephcott | 704/3 |
| 2013/0149990 A1 * | 6/2013 | Otto et al. | 455/404.2 |
| 2014/0315596 A1 * | 10/2014 | Otto | 455/552.1 |

* cited by examiner

*Primary Examiner* — David Bilodeau

(57) ABSTRACT

A communications system allows audio, video, and data to be transmitted between a remote unit, a command unit, and alternate units. A person at the remote unit can receive and respond to voice communications through a provided handset. A person at the command unit can connect a compatible device, such as a headset, to the command unit in order to listen to and speak with a person at the remote unit. The command unit is capable of monitoring the area of the remote unit via hidden video cameras and microphones installed in the remote unit. Accessory modules can be installed in the remote unit or connected to the command unit to provide additional capabilities, such as voice-stress analysis, pulse monitoring, fingerprint identification, transcription, and translation. Additional modules can be connected to the command unit to allow separate groups to simultaneously access and participate in communications with the remote unit.

16 Claims, 10 Drawing Sheets

ND ADVANCED COMMUNICATION
SYSTEM

The current application claims a priority to the U.S. Provisional Patent application Ser. No. 61/813,024 filed on Apr. 17, 2013.

FIELD OF THE INVENTION

The present invention relates generally to a communications system that allows for multiple means of communications with a person or persons at a remote location, useful for hostage negotiations, interviews, and other potential applications.

BACKGROUND OF THE INVENTION

The ability to communicate between two locations is desirable in many situations in which existing communications lines are unavailable or insufficient. While telephones are ubiquitous in the modern age, the average phone lacks many features, such as monitoring capabilities and physical sensors. Furthermore, the average phone requires cooperation of both parties in order to carry a conversation; if a person does not pick up a call, discussions cannot be held. There are a number of scenarios where it is desirable to provide capabilities beyond simply basic audio communications. For example, video feeds, measuring physical characteristics, and allowing multiple persons to participate in a call are beneficial in applications such as hostage negotiations and conducting interviews.

It is therefore an object of the present invention to provide an advanced system that allows for communications between a remote unit and a command unit. It is a further object of the present invention to provide ports for connecting additional modules to allow the present invention to easily be configured for a specific application. The present invention additionally provides several communications means, allowing for both wireless and wired transmissions of information; furthermore, the present invention can directly tap into existing landlines. Additional secondary means of communications can also be provided via the present invention, with the present invention potentially being able to utilize IP, satellite, and RF (e.g. radio) channels in order to transmit data. Data is not limited to being transmitted between the remote unit and command unit, as accessory devices can communicate with either unit through provided channels. For example, software defined radio can be installed on the remote unit to allow radio transmissions to be sent to the command unit, effectively emulating a bodywire transceiver. Ultimately, the present invention provides an system for communications response and management, offering a multitude of user applications and options.

DETAIL DESCRIPTIONS OF THE INVENTION

All illustrations of the drawings are for the purpose of describing selected versions of the present invention and are not intended to limit the scope of the present invention.

Figure 1:
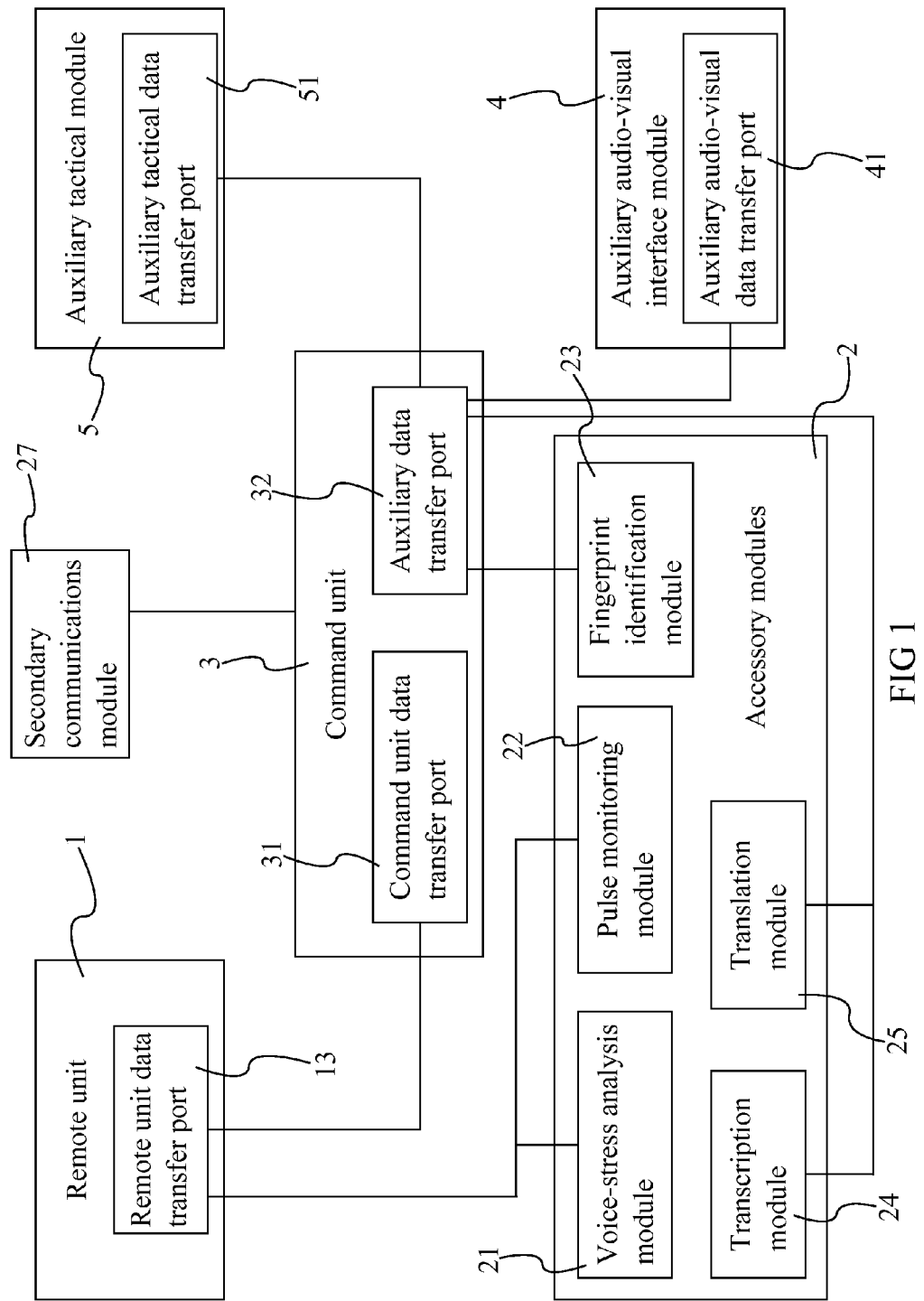
FIG. 1 is a general diagram outlining components of the present invention.

The present invention is a modular advanced communication system that provides a centralized hub through which a first party can communicate with a second party. Additional parties may monitor the communications by connecting to the centralized hub. The modularity of the present invention allows for auxiliary capabilities to easily be incorporated as needed. The present invention is well suited for use as a throw phone system, used in hostage negotiations, but is not limited to such and may be applied in numerous other situations. An example of a non-limiting alternative use is conducting an interview between the first party and a second party. To enable these functions, the present invention comprises a remote unit 1, a plurality of accessory modules 2, and a command unit 3 the first and last of which are capable of exchanging information with each other by means of a direct wired and wireless connection. A visual representation of relationships between these components is provided in FIG. 1.

Figure 2:
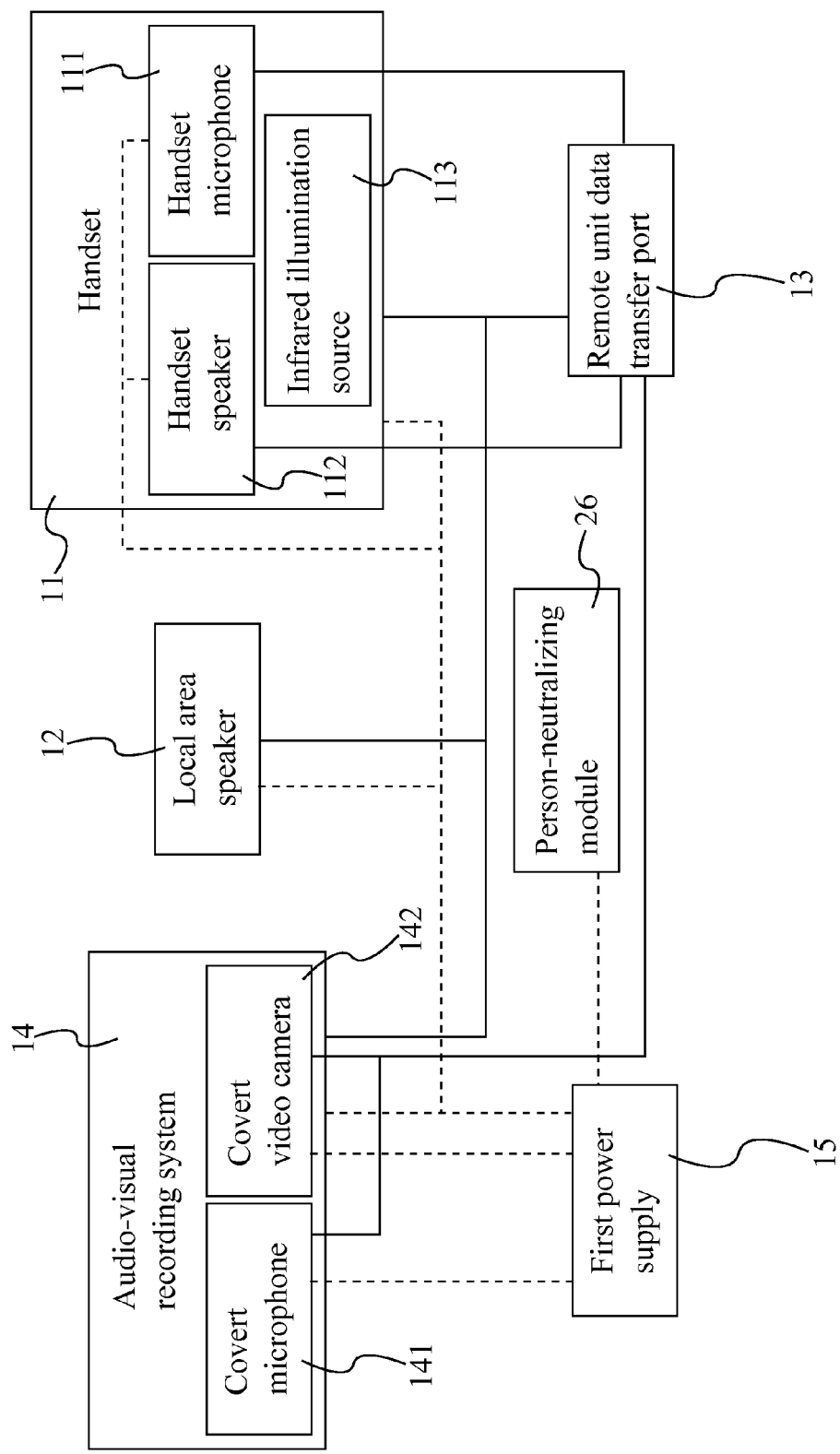
FIG. 2 is a general diagram outlining components of a remote unit of the present invention.

The remote unit 1 comprises a handset 11, a local area speaker 12, a remote unit data transfer port 13, an audio-visual recording system 14, and a first power supply 15. Not only do these components support communication between parties, they also allow a person at the command unit 3, other selectable units, or a combination thereof to continuously monitor the immediate area of the remote unit 1. In addition to communications and remote monitoring, additional capabilities are provided through the plurality of accessory modules 2. A number of capabilities are possible, whether directly implemented into the remote unit 1 or provided through the accessory modules 2. For example, the handset 11 (also known as a "throw phone") may be provided with a display screen and print-based communications abilities, a common but non-limiting example being texting. These abilities can make use of other provided functions, such as translation, to provide a greater array of options to a user of the present invention. In the preferred embodiment the plurality of accessory modules 2 comprises a voice-stress analysis module 21, a pulse monitoring module 22, and a fingerprint identification module 23. These specific accessory modules 2 have been identified by the inventor as providing desirable capabilities that have yet to be addressed by the prior art. The command unit 3 comprises a command unit data transfer port 31, an at least one auxiliary data transfer port 32, a landline capture port 33, a plurality of audio-visual ports 35, a plurality of control panels 36, a charging port 37, and a second power supply 38. While it is understood that alternating current, direct current, and in general 12 volt units can be used for the power supplies, in the preferred embodiment a low voltage transformer is provided to lower voltage output to an optimal level. These components support communications and monitoring from the command unit 3, whether said communications are directed straight to the remote unit 1 or passed through a secondary communication channel; an example of the latter is a landline that is capable of reaching the party of the remote unit 1 and which is tapped by the command unit 3. A general outline of the remote unit 1 and its subsequently described components is provided in FIG. 2.

The components introduced thus far enable operation of the present invention on a general level. Communication between the remote unit 1 and the command unit 3 is enabled by the remote unit data transfer port 13 and the command unit data transfer port 31, the two of which are communicably coupled to each other. The handset 11 and the audio-visual recording system 14 are communicably coupled to the remote unit 1 data transfer port 13, allowing audio, video, and data to be captured at the remote unit 1 and transmitted to the command unit 3. In order to allow the present invention to be used in the absence of an external energy source, the handset 11, local area speaker 12, and audio-visual recording system 14 of the remote unit 1 are electrically connected to the first power supply 15. Likewise, the plurality of control panels 36 and the charging port 37 of the command unit 3 are electrically connected to the second power supply 38. If an external energy source is available it can be electrically connected to the charging port 37 in order to recharge the second power supply 38 and significantly extend the operating time of the command unit 3.

In order to allow direct communication with a person at the remote unit 1 the handset 11 comprises a handset microphone 111 and a handset speaker 112, both of which are communicably coupled to the handset microphone 111. The handset microphone 111 and the handset speaker 112 enable sounds to be converted to electrical signals which can be transmitted through the remote unit 1 data transfer port 13. The handset 11, itself known in the art, is an device that provides an ergonomic handle which allows a user to hold the handset 11 next to their head. An ear portion and a mouth portion optimally position their respective speaker 112 and microphone 111 with respect to the user's head. The ear portion and mouth portion are also often used to couple with a cradle, upon which the handset 11 is placed when not in use. Though the present invention describes a handset 11, any similar communications device that provides a speaker 112 and a microphone 111 can be used. For example, a headset that secures directly to a person's head can be used in place of the handset 11. Other embodiments, as desired, may use further alternative handset-equivalent devices.

The handset 11 further comprises an infrared illumination source 113 which is mounted to the remote unit 1. The infrared illumination source 113 is provided for the benefit of infrared sensitive sighting tools, whether part of a camera or a rifle scope. An infrared illumination source 113 is preferable over a source that produces light in the visible spectrum as it is not noticeable to humans and thus unlikely to cause an adverse reaction from a person at the remote unit 1. Avoiding antagonizing a person at the remote unit 1 is of great concern in certain applications of the present invention, such as when used during hostage negotiations. It is for this reason that the an infrared illumination source 113 is used, though other embodiments can utilize visible wavelengths of light or choose to simply omit the infrared illumination source 113. Potentially, the infrared illumination source 113 can be installed at any position of the remote unit 1. For example, it may be mounted to the handset 11 to better illuminate a subject speaking through the handset 11, or may instead be mounted around the faces of the remote unit 1 to better illuminate the surrounding area.

As the handset 11 requires cooperation of an individual at the remote unit 1 in order to be effective, the audio-visual recording system 14 is provided to allow unidirectional communication and monitoring of the remote unit 1. Supporting these functions the audio-visual recording system 14 comprises a covert microphone 141 and at least one covert video camera 142. The covert microphone 141 allows audio at the remote unit 1 to be recorded and transmitted back to the command unit 3, thanks to the covert microphone 141 being communicably coupled to the remote unit data transfer port 13. The covert microphone 141 is not intended to be visually noticeable and thus is mounted within the remote unit 1, hidden from sight. Similar to the infrared illumination source 113, hiding the covert microphone 141 is beneficial in certain situations (e.g. hostage negotiations) where it is not desirable for a person to know about the covert microphone 141; if a person does not know about the microphone they might divulge valuable information that they wouldn't knowingly reveal to a party at the command unit 3. That is, the person might say something to those in the area of the remote unit 1 that they wouldn't say when talking to the command unit 3 via the handset 11. A further advantage of the covert microphone 141 is that, unlike the handset 11, it allows all audio from the immediate area of the remote unit 1 to be recorded. This is beneficial as some persons at the remote unit 1 might be forbidden or unable to speak through the handset 11; providing the covert microphone 141 allows them to be heard, though they themselves and others at the remote unit 1 are likely not aware of the covert microphone 141.

Expanding upon monitoring capabilities, the at least one covert video camera 142 allows for video feeds in addition to audio feeds. Video feeds are beneficial as many conversational nuances and physical cues are diminished or simply not recognizable through audio only communications. Video feeds also enable persons at the command unit 3 to see the surrounding area of the remote unit 1. This is useful for several purposes, such as verifying the health of those around the remote unit 1 or tracking position and movement of potentially hostile persons. In the preferred embodiment there are six video cameras, all mounted within the remote unit 1 and communicably coupled to the remote unit data transfer port 13. Four of the video cameras 142 are positioned around a lateral surface of the remote unit 1, while a fifth video camera 142 is positioned at a top surface of the remote unit 1. A sixth video camera 142 is positioned at a bottom surface of the remote unit 1, which ensures that an upwards facing video camera 142 will be available even if the remote unit 1 is in an upside down orientation. This positioning maximizes video coverage, guaranteeing that each exposed face of the remote unit 1 is provided with a respective covert video camera 142. The full video coverage is beneficial in various situations, an example being a police operation where the remote unit is thrown into a room and is not guaranteed to land right-side up orientation. While the cameras are designed to be hidden and go unnoticed, similar to the covert microphone 141, the camera lens will need to be partially exposed as the lens needs to receive some light in order to record video. Taking advantage of the infrared illumination source 113 of the handset 11, the covert video cameras 142 are preferably infrared sensitive. This allows footage to be recorded in situations where the ambient illumination insufficient for recording video via visible wavelength. In such situations the video cameras 142 can simply record audio/visual data in the infrared spectrum, without needing a visible light that could potentially alert hostile persons at the remote unit 1. Beyond simply recording footage, software can be installed that allows uses input footage obtained from the video cameras 142 to estimate and render a mock-up of the surrounding area (e.g. a room) of the remote unit 1. This software is proprietary and, if available in time, might be obtained from publically available retailers. The latter type is often referred to as "Commercial Off-The-Shelf" or COTS.

While the audio-visual recording system 14 has been described as using a covert microphone 141 and set of covert video cameras 142, in one embodiment it may add or substitute an overt microphone and set of overt video cameras. Through the provision of these overt audio-visual devices for both the remote unit 1 and the command unit 3, the present invention allows for two-directional communications via the audio-visual recording system 14.

The audio-visual recording system 14 is provided with further capabilities and can be expanded upon while remaining within the scope of the present invention. Users of the present invention are able to select between individual video camera 142 feeds, and if desired can view multiple feeds at once. Furthermore, the feeds (not only video, but also audio and data) can be distributed in real time, allowing for the constant monitoring of audio, video, and data gathered by the present invention. These options are provided to afford a user a number of options, allowing the user to access the best feeds (or combinations thereof) during any given situation, as while as changing feeds to adapt to an evolving situation.

The array of communications and monitoring abilities provided at the remote unit 1 is completed by the local area speaker 12. The local area speaker 12 is provided for addressing all persons in the immediate area of the remote unit 1, rather than being limited to talking to a single individual via the handset 11. In combination with the covert microphone 141 the local area speaker 12 allows persons at the command unit 3 to both speak to and hear persons surrounding the remote unit 1 instead of being limited to communicating with a person at the handset 11. The covert video cameras 142, in combination with the covert microphone 141, local area speaker 12, and handset 11, thus provide a party at the command unit 3 with several means to monitor and communicate with persons at the remote unit 1. These components are provided with the necessary operating power by the first power supply 15, which is electrically connected to said covert video cameras 142 and covert microphone 141, in addition to the handset 11 and local area speaker 12.

Figure 3:
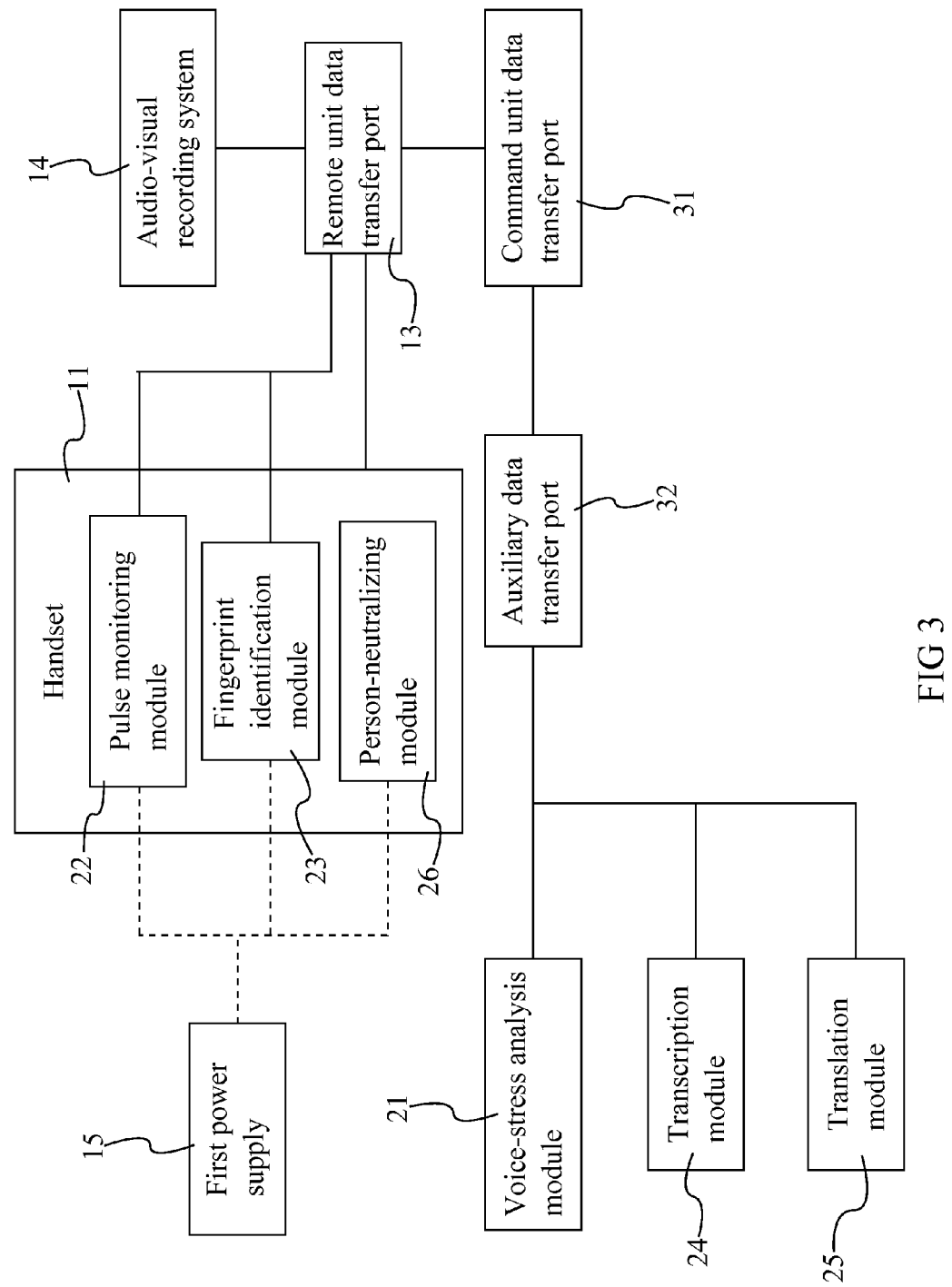
FIG. 3 is a general diagram outlining preferred accessory modules of the present invention.

The plurality of accessory modules 2, as earlier referenced, provides a number of capabilities that are lacking in the prior art. The voice-stress analysis module 21, the pulse monitoring module 22, and the fingerprint identification module 23 are used to record and analyze various types of data gathered at the remote unit 1. The voice-stress analysis module 21 uses proprietary software to provide an output detailing the stress levels of a person talking at the remote unit 1. Similarly, the pulse monitoring module 22 uses its own proprietary software to detect and measure the pulse of a person holding the handset 11. Finally, the fingerprint identification module 23 can capture fingerprint data of a person holding the handset 11, useful for helping to identify unknown persons using the handset 11 of the remote unit 1. The output results can then accessed by the command unit 3, thanks to the pulse monitoring module 22 and the fingerprint identification module 23 being communicably coupled to the remote unit data transfer port 13. To better interact with a person holding the handset 11, the pulse monitoring module 22 and the fingerprint identification module 23 are housed in the handset 11. This positioning is used in the preferred embodiment as many methods of measuring pulse or capturing fingerprints require physical contact to capture the data necessary for analysis. However, as there are methods that are non-contact based, other embodiments may simply position the pulse monitoring module 22 and the fingerprint identification module 23 in the remote unit 1 or potentially external to the remote unit 1 as completely separate standalone units, rather than specifically housing them in the handset 11. The accessory modules 2, subsequently described with additional detail, are outlined in FIG. 3.

One possible additional feature, to be installed in the handset 11 or the remote unit 1, is a person-neutralizing module 26. A number of neutralization methods and supporting components can be implemented through this module, powered through an electrical connection to one of the power supplies. Possibilities include neurological or physical frequency control. For example, through the person-neutralizing module 26 a shock may be imparted to a subject in physical contact with the handset 11. Another possibility is inducing nausea in the subject through the person-neutralizing module 26. These are just a few examples of neutralization methods; other methods and components may be used while remaining under the scope of the present invention.

In the preferred embodiment the plurality of accessory modules 2 additionally comprises a transcription module 24 and a translation module 25. The transcription module 24 and the translation module 25 are provided to create transcripts and translations of all communications carried out through the remote unit 1 as necessary. These modules are beneficial as human transcribers and language translators may not always be available; furthermore, automated processes are not limited in speed by the same factors as humans. As part of a modular design for the present invention, the voice-stress analysis module 21, the transcription module 24, and the translation module 25 are communicably coupled to the at least one auxiliary data transfer port 32 of the command unit 3. This provides them with access to audio from the handset 11 and covert microphone 141, which can be analyzed, transcribed, or translated by the respective module. If any modules are not deemed necessary in a given situation, then they do not need to be communicably coupled to the at least one auxiliary data transfer port 32. Effectively, modular features are designed to be interchangeable such that they can be selected or omitted per user discretion. This frees up auxiliary data ports 32 for other uses and helps to reduce unnecessary clutter in the area of the command unit 3. In other embodiments, these additional modules could be housed within the command unit 3 or the remote unit 1, similar to the pulse monitoring module 22 and the fingerprint identification module 23. As earlier referenced, the pulse monitoring module 22 and the fingerprint identification module 23 could potentially be implemented as standalone modules separate from the remote unit 1, similar to the voice-stress analysis module 21, transcription module 24, and the translation module 25. However, doing so would still require the appropriate sensors to be installed in the handset 11, as additional data beyond audio and video streams still needs to be collected for pulse monitoring and fingerprint identification. In the preferred embodiment, where the pulse monitoring module 22 and the fingerprint identification module 23 are installed in the handset 11, they are powered through an electrical connection to the first power supply 15. The other modules are preferably powered by internal power supplies, though they may potentially draw power through a cable connecting them to the command unit 3.

Figure 4:
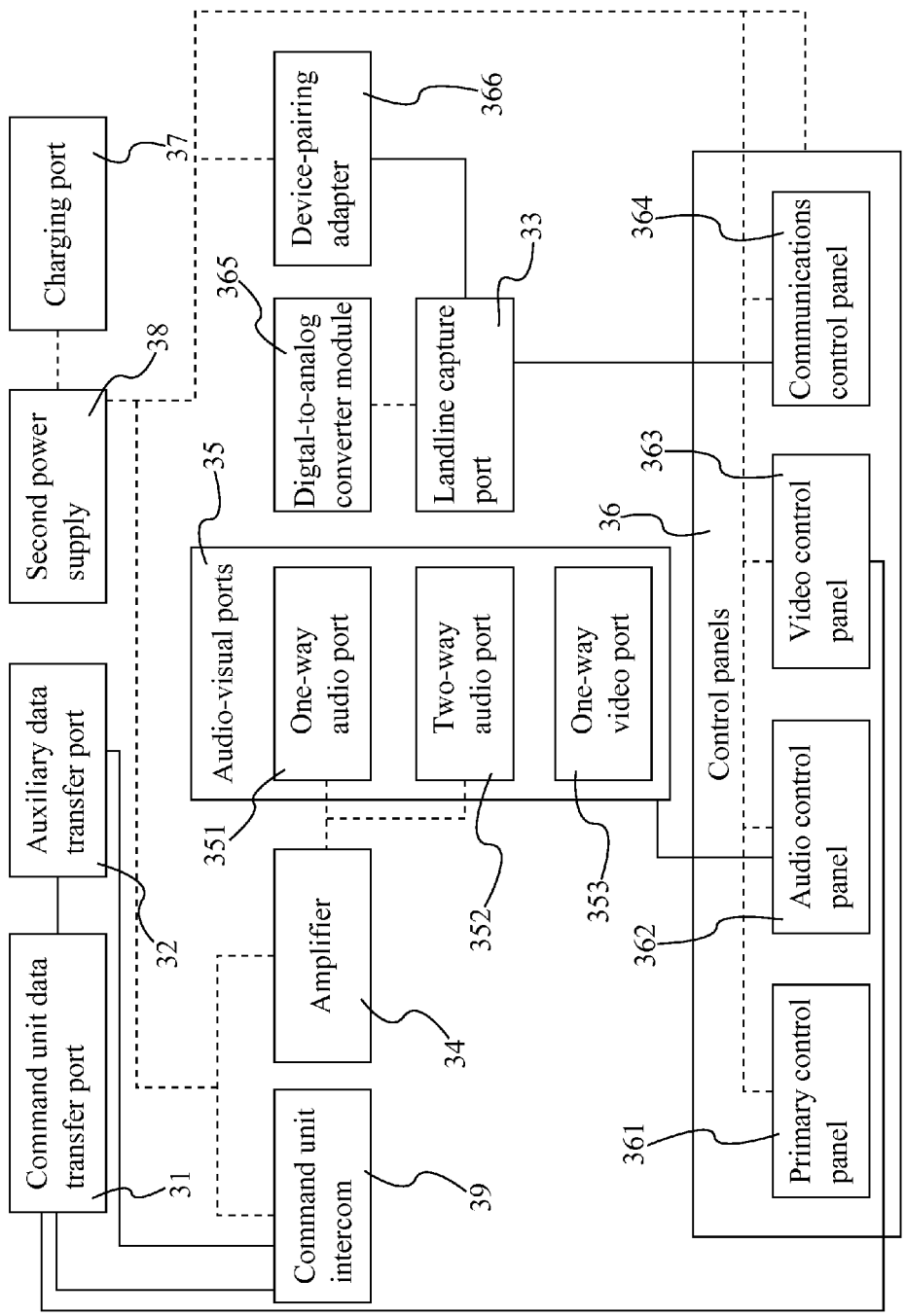
FIG. 4 is a general diagram outlining a communications cable of the present invention.

In the preferred embodiment, the remote unit data transfer port 13 is communicably coupled to the command unit data transfer port 31 by means of a communications cable 131. The communications cable 131, in addition to data transfer, provides a means of confirming that each end is properly connected. A first end 132 of the communications cable 131, which is connected to the remote unit data transfer port 13, comprises a first connection verification circuit 134. Paralleling this, a second end 133 of the communications cable 131 is connected to the command unit data transfer port 31 and comprises a second connection verification circuit 135. Each of these connection verification circuits comprise a status indicator 136, which lights up in a preferred embodiment to indicate a completed connection. When the first end 132 of the communications cable 131 is connected to the remote unit data transfer port 13, the first connection verification circuit 134 becomes electrically connected to the remote unit data transfer port 13. This results in the status indicator 136 being electrically activated. A similar configuration is used for the second connection verification circuit 135, in which the status indicator 136 is electrically connected to the connected command unit data transfer port 31. As with the first connection verification circuit 134, the circuit completion results in the status indicator 136 being electrically activated. Preferably, when both the first connection verification circuit 134 and the second connection verification circuit 135 are showing a verified connection, a connection status indicator 136 on the communications unit is activated; this allows a person at the command unit 3 to quickly verify that the connection between the remote unit 1 and the command unit 3 is still functioning. This cable configuration is represented in FIG. 4.

To enable persons at the command unit 3 to listen to communications from the remote unit 1 or to communicate with auxiliary modules, the command unit 3 comprises an amplifier 34 and a command unit intercom 39 in addition to the plurality of audio-visual ports 35. The plurality of audio-visual ports 35 comprises an at least one one-way audio port 351, and at least one two-way audio port 352, and an at least one one-way video port 353. The at least one one-way audio port 351 and the at least one two-way audio port 352 are electrically connected to the command unit data transfer port 31 through the amplifier 34. This allows them to receive electrical signals from the covert microphone 141 and handset microphone 111 of the remote unit 1, which are then passed through the amplifier 34 prior to being output at the respective ports. The one-way audio port 351 is provided for listening via the covert microphone 141, whereas the two-way audio port 352 is provided for both listening and speaking to a person holding the handset 11. The command unit intercom 39 is communicably coupled to both the command unit data transfer port 31 and the at least one auxiliary data transfer port 32, allowing it to transmit audio to the local area speaker 12 (via the command unit data transfer port 31) and accessory modules 2 (via the auxiliary unit data transfer port 32). It is noted that while the command unit intercom 39 is able to communicate with the remote unit 1, it is primarily provided to enable closed-circuit communication between the command unit 3 and auxiliary modules (e.g. auxiliary audio-visual interface module 4 and auxiliary tactical module 5) of the present invention. The command unit intercom 39 is still capable of performing secondary tasks, such as the aforementioned communication with the remote unit 1.

To make use of the audio-video ports, external devices are plugged into the appropriate ports. For example, a headset can be connected to the two-way audio port 352 to allow a person at the command unit 3 to speak with a person at the remote unit 1 via the handset 11. The one-way audio port 351 and one-way video port 353 can be directly connected to a user-provided display/monitoring method, allowing persons at the command unit 3 to watch and listen to video and sound recorded by the at least one covert video camera 142 and the covert microphone 141. Additional audio ports and video ports may provided to allow multiple persons to listen in access audio and video feeds. In a preferred embodiment there is a subset of two-way audio ports 352 that are able to listen to communications from the handset 11 of the remote unit 1, but are not able to respond; this feature is provided to allow multiple persons to listen in to conversation carried out via the handset 11 without overwhelming a person at the handset 11 or creating confusion that might result from having several conversational partners at the command unit 3 trying to talk at the same time.

In order to adjust volume, switch between cameras, and input other desirable commands, the plurality of control panels 36 is provided for the command unit 3. The plurality of control comprises a primary control panel 361, an audio control panel 362, a video control panel 363, and a communications control panel 364 are provided to enable a user to interact with the various components of the present invention. In order to adjust volume and other audio-related features, the audio control panel 362 is communicably coupled to the plurality of audio-visual ports 35. The video control panel 363, which allows a user to manage the video output between different covert video cameras 142, is communicably coupled to the command unit data transfer port 31. By interacting with the video control panel 363 a user can thus select which covert video camera 142 is providing the active feed, or even choose to output multiple camera views (e.g. a "QuadView" selection that shows four or more simultaneous video feeds) to one or more connected user-provided displays. The communications control panel 364, provided for controlling and interacting with the landline capture port 33 and related capabilities, is communicably coupled to the landline capture port 33. Finally, the primary control panel 361 is used for any desirable operations specific to the command unit 3, such as turning the unit on or off. In order to operate, the primary control panel 361, the audio control panel 362, the video control panel 363, and the communications control panel 364 are electrically connected any of its power supplies.

The plurality of control panels 36 is potentially connected to a processing unit which is capable of receiving commands and communicating/distributing them to the necessary/selective destination. For example, if receiving a command to activate QuadView through the video control panel 363, the processing unit communicates instructions to activate four or more camera views, relayed through the command unit data transfer port 31 and terminating at the covert video cameras 142 in the remote unit 1. Other electronics can potentially be used to handle or assist with communications between components of the present invention; a number of configurations for circuits and printed circuit boards are possible as the operation of the present invention is not limited to a single specific configuration of circuits. As the plurality of control panels 36 is ultimately provided to serve as a user-operable interface, any variations in circuits falls within the scope of the present invention.

The landline capture port 33 of the present invention is beneficial as it allows for landlines to be tapped and even can be used to completely capture a landline system, such that all incoming and outgoing calls pass through the command unit 3. This provides additional means of communications with a person at the remote unit 1 as is desirable in certain situations. The ability to filter or intercept outgoing calls is also beneficial, as it provides a greater level of control over incoming and outgoing communications with a person at the remote unit 1. A person at the command unit 3 is also able to use a personal device, e.g. a cellular phone, to access and control the landline. This control is afforded by a device-pairing adapter 366, which is communicably coupled to the landline capture port 33 and powered by an electrical connection to any of its power supplies. While the device-pairing adapter 366 can potentially be hardwired (with a corresponding connecting port for the cellular phone), wireless, or even provide the option for each, the preferred embodiment implements a BlueTooth wireless component as the device-pairing adapter 366. BlueTooth is utilized in the preferred embodiment as the pairing of devices is a streamlined and user-friendly process with BlueTooth. The present invention is not restricted to BlueTooth, and potentially a number of alternative wireless components can be added to or substituted for the BlueTooth option. A potential feature afforded by the BlueTooth (or alternative) component is the ability to wirelessly connect to the command unit 3 or even the remote unit 1.

Figure 5:
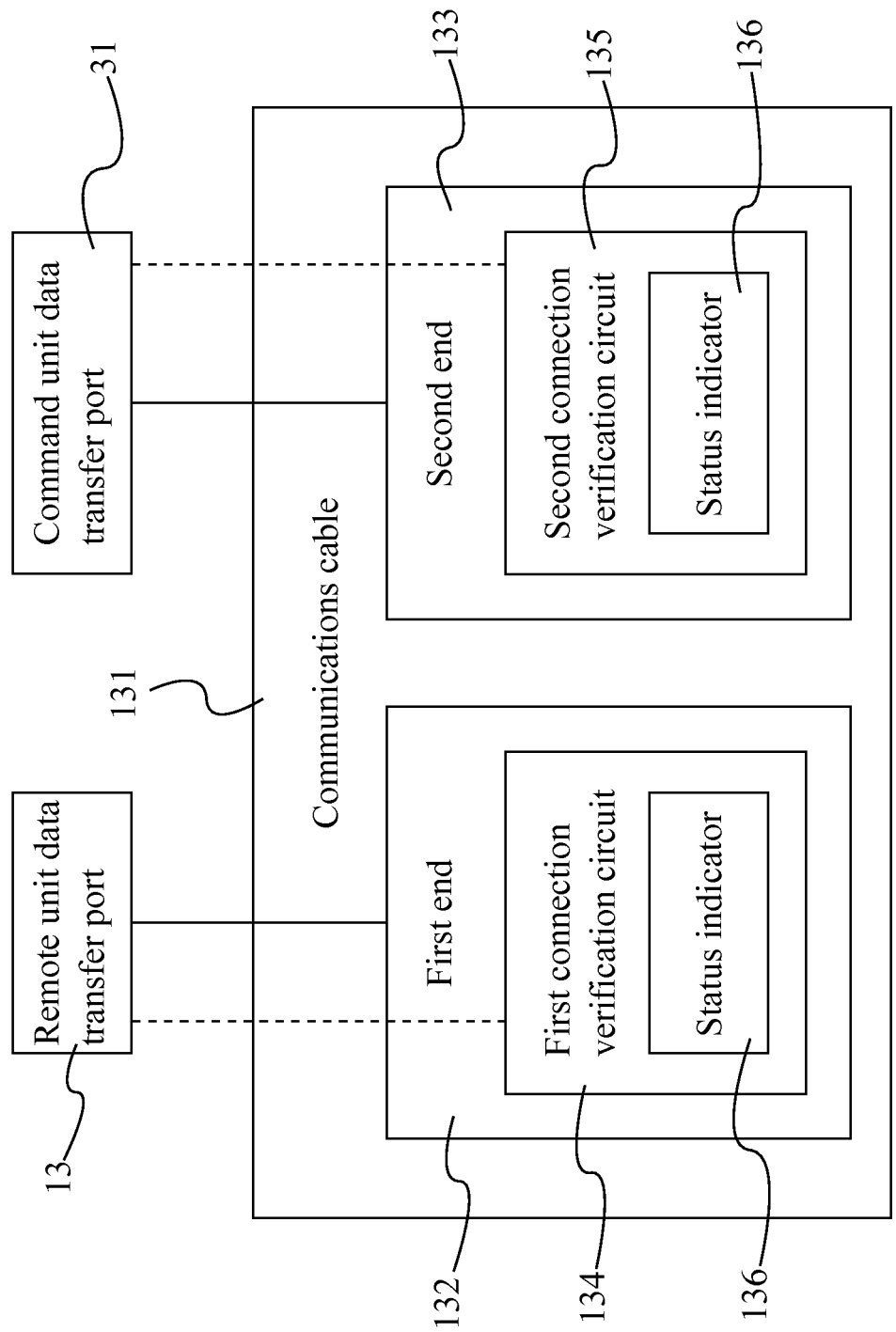
FIG. 5 is a general diagram outlining components of a command unit of the present invention.

Though residential landline systems are primarily analog, digital landlines are encountered in a number of other environments, an example being commercial zones. To accommodate for this the present invention provides a digital-to-analog converter module 365, which is electrically connected to the landline capture port 33 such that the converter module 365 acts as an adapter for a landline phone and the command unit 3. This converter module 365 allows digital signals to be converted to analog signals which are compatible with the present invention. As with other modules, the digital-to-analog signal converter only needs to be connected if needed in a specific situation, fitting in with the modular nature of the present invention. Potentially, the digital-to-analog signal converter module 365 could instead be integrated into the landline capture port 33; this would ensure that it always available if needed, though this would increase cost of the command unit 3 and conflict with the desired modular aspect of the present invention. The previously described components of the command unit 3 are illustrated via FIG. 5.

Figure 6:
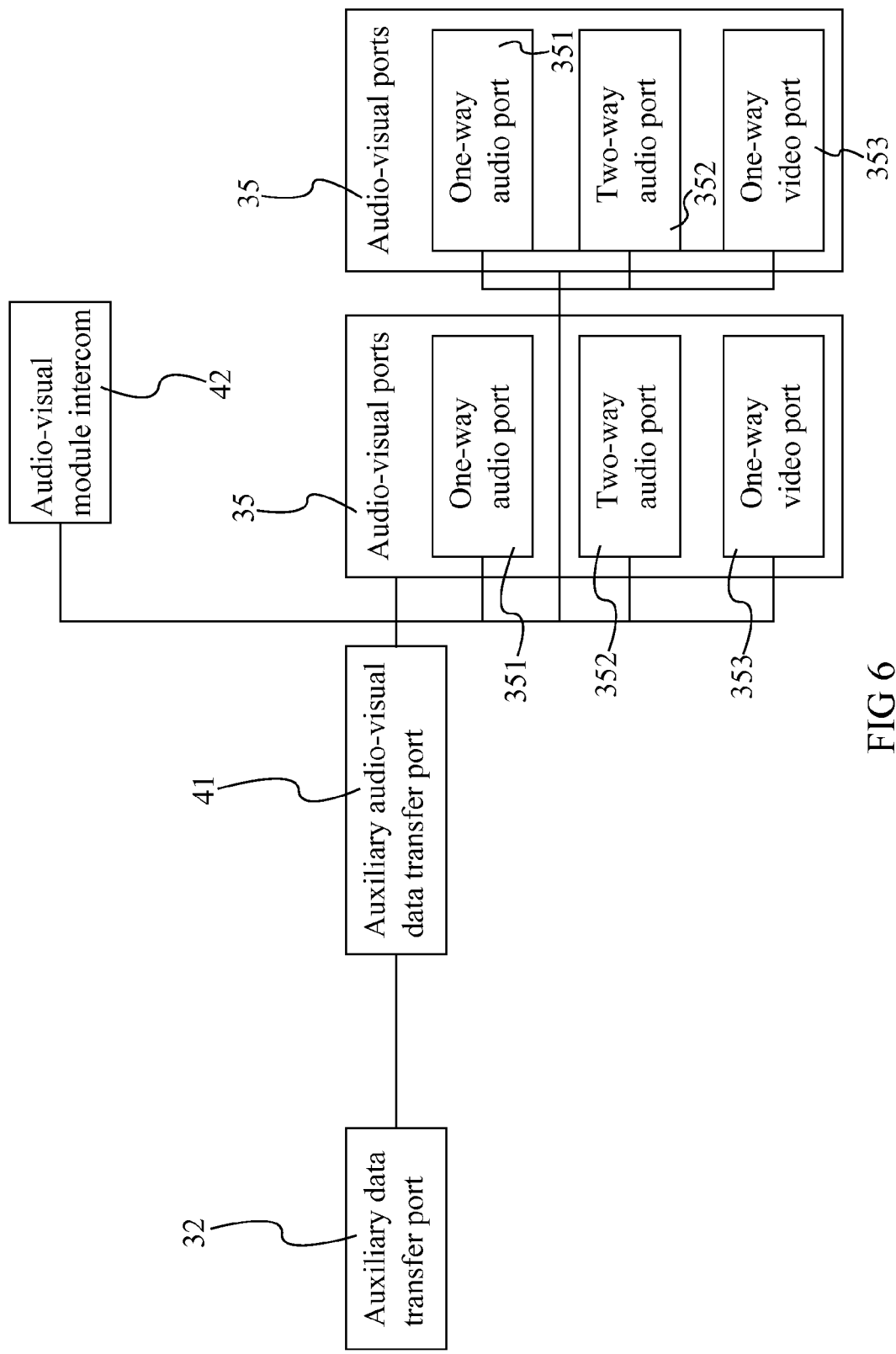
FIG. 6 is a general diagram outlining components of an auxiliary audio-visual interface module of the present invention.

Continuing with the modular theme of the present invention, an at least one auxiliary audio-visual interface module 4 and an at least one auxiliary tactical module 5 are provided for potential connection to the command unit 3. The auxiliary audio-visual interface module 4 is provided to act as an additional terminal for receiving data from the handset 11 and the audio-visual recording system 14. This allows multiple teams to listen into and even participate in conversations with a party at the remote unit 1. As a result, the auxiliary tactical module 5 comprises an auxiliary data transfer port 32, a tactical module intercom 52, the plurality of audio-visual ports 35, and the plurality of control panels 36. The plurality of audio-visual ports 35, identical to those of the command unit 3, comprises at least one one-way audio port 351, at least one two-way audio port 352, and at least one one-way video port 353. These ports enable external devices such as headsets and display screens to be connected to the auxiliary audio-visual interface module 4 in order for a secondary team to access audio and video data from the remote unit 1. This communication is enabled by the at least one auxiliary data transfer port 32 being communicably coupled to the audio-visual module intercom 42, the at least one one-way audio port 351, the at least one two-way audio port 352, and the at least one one-way video port 353, with all the communications being completed through the auxiliary audio-visual data transfer port 41. The audio-visual module intercom 42 is capable of sending and receiving audio communications to the command unit intercom 39, allowing persons at the command unit 3 to easily and quickly talk to persons at the audio-visual interface module 4, and vice versa. A diagram of this auxiliary audio-visual interface module 4 is provided in FIG. 6.

The auxiliary tactical module 5 is similar in functionality to the auxiliary audio-visual interface module 4, with some additions which expand its capabilities. The auxiliary tactical module 5 comprises an auxiliary tactical data transfer port 51, a tactical module intercom 52, the plurality of audio-visual ports 35, and the plurality of control panels 36, the latter two of which are components that are shared with (but not limited to) the command unit 3 and the auxiliary audio-visual interface module 4. The plurality of audio-visual ports 35 again comprises at least one one-way audio port 351, at least one two-way audio port 352, and at least one one-way video port 353. The plurality of control panels 36 simply comprises the video control panel 363; thus far the auxiliary tactical module 5 is nearly identical to the auxiliary audio-visual interface module 4, with the only difference being the addition of the video control panel 363. Thus the auxiliary tactical module 5 provides the same functionality as the auxiliary audio-visual interface module 4 and further allows commands relating to the covert video cameras 142 (e.g. switching the active camera) to be input at the auxiliary tactical module 5. Communications are possible due to the auxiliary data transfer port 32 being communicably coupled to the tactical module intercom 52, the at least one one-way audio port 351, the at least one two-way audio port 352, and the at least one one-way video port 353, and the video control panel 363 via the auxiliary tactical module 5 data transfer port.

As the data transfer ports of the present invention are preferably capable of transmitting electricity, the auxiliary audio-visual interface module 4 and the auxiliary tactical module 5 do not require associated primary power supplies. Instead, they receive sufficient power through their respective data transfer ports. However, in some alternative embodiments where data transfer may be performed wirelessly, it would then become necessary to provide an individual power supply for each auxiliary module.

Figure 7:
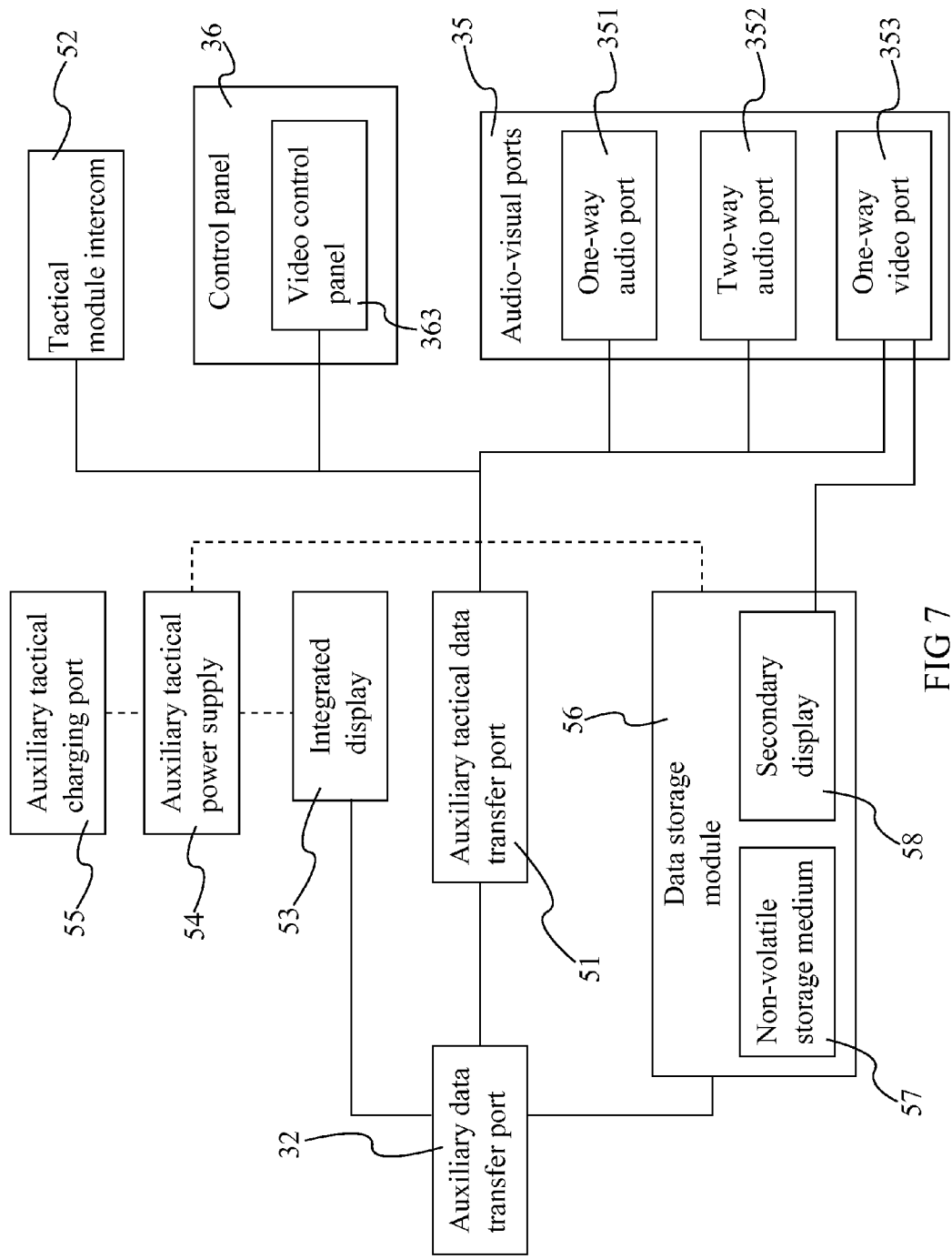
FIG. 7 is a general diagram outlining components of an auxiliary tactical module of the present invention.

Supporting additional capabilities, the auxiliary tactical module 5 further comprises an auxiliary tactical power supply 54, an auxiliary tactical charging port 55, and an integrated display 53. The integrated display 53 is provided to allow video to be viewed directly through the auxiliary tactical module 5 and is thus mounted onto the auxiliary tactical module 5. A data storage module 56 provides an secondary unit which can save data as well as provide a larger screen; to this end the data storage module 56 comprises a non-volatile storage medium 57 and a secondary display 58. In a preferred embodiment the integrated display 53 is larger than the secondary display 58, though the size of the integrated display 53 and the secondary display 58 can vary with embodiments. Indeed, in some embodiments the secondary display 58 may be larger than the integrated display 53. The data storage module's 56 non-volatile storage medium 57 provides local convenient storage that allows material to be stored for later review and analysis. These additional components are able to receive information as the command unit data transfer port 31 is electrically connected to the integrated display 53 and the data storage module 56 through the auxiliary tactical module 5 data transfer port. The non-volatile storage medium 57 not only allows material to be reviewed at a later time, but also allows material to be used for real-time analysis. Material may even been looped back as necessary. In combination with delayed analysis and review (e.g. in addition to real-time), the non-volatile storage medium 57 helps to provide a common operational picture. Power is supplied to the components by the auxiliary tactical power supply 54, which is electrically connected to the auxiliary tactical charging port 55, the integrated display 53, and the data storage module 56. A diagram of this auxiliary tactical module 5 is provided in FIG. 7.

Preferably, the present invention also allows for the implementation of additional communications channels, including IP, satellite, and radio. These communications channels can provide additional near field communications means as well as enable long range communications. The ability to communicate over long distances provides additional resources to users of the present invention. For example, an IP connection can be used to perform remote diagnosis, servicing, and software upgrades. This helps to minimize down-time and reduce maintenance costs, as support personnel do not need to be available on site. These capabilities are provided through a secondary communications module 27 which preferably supports IP communications and may also enable satellite communications, radio communications, or both. The secondary communications module 27 is communicably coupled to the command unit 3 to allow long distance communications to be passed to the present invention and distributed as necessary between the other modules and remote unit 1.

Figure 8:
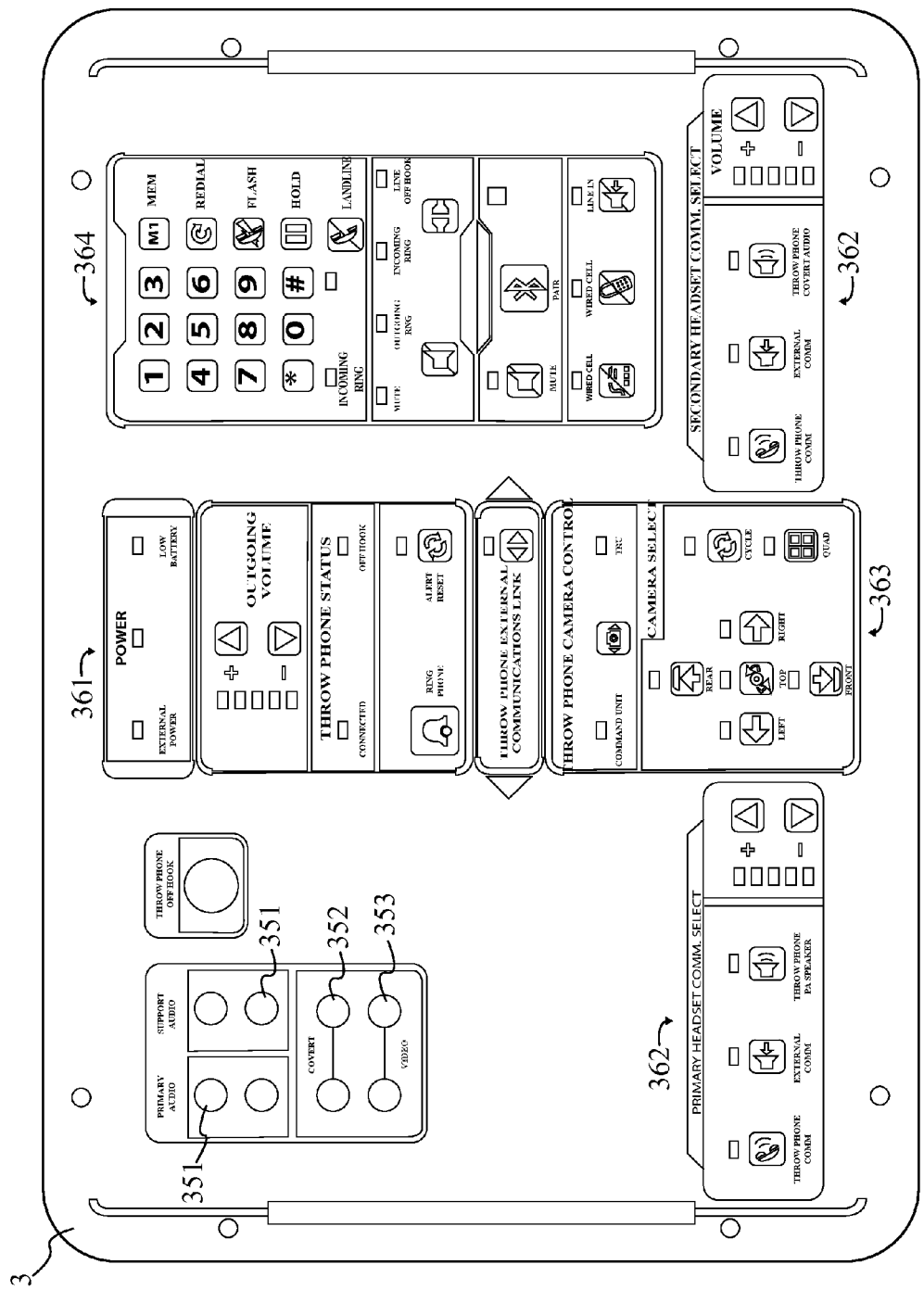
FIG. 8 is a drawing showing a possible construction of the command unit of the present invention.
Figure 9:
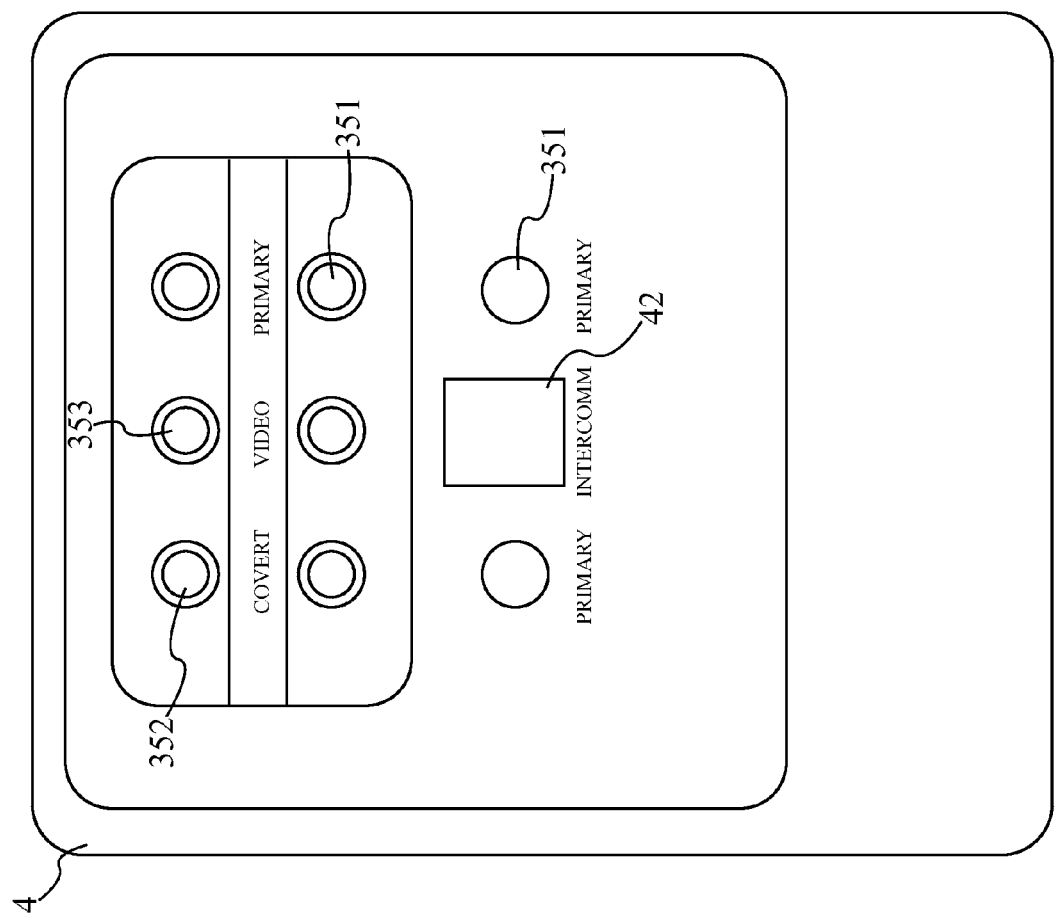
FIG. 9 is a drawing showing a possible construction of the auxiliary audio-visual interface module of the present invention, the auxiliary audio-visual interface module being adaptable to multiple user selective configurations from audio, video, and data flow.
Figure 10:
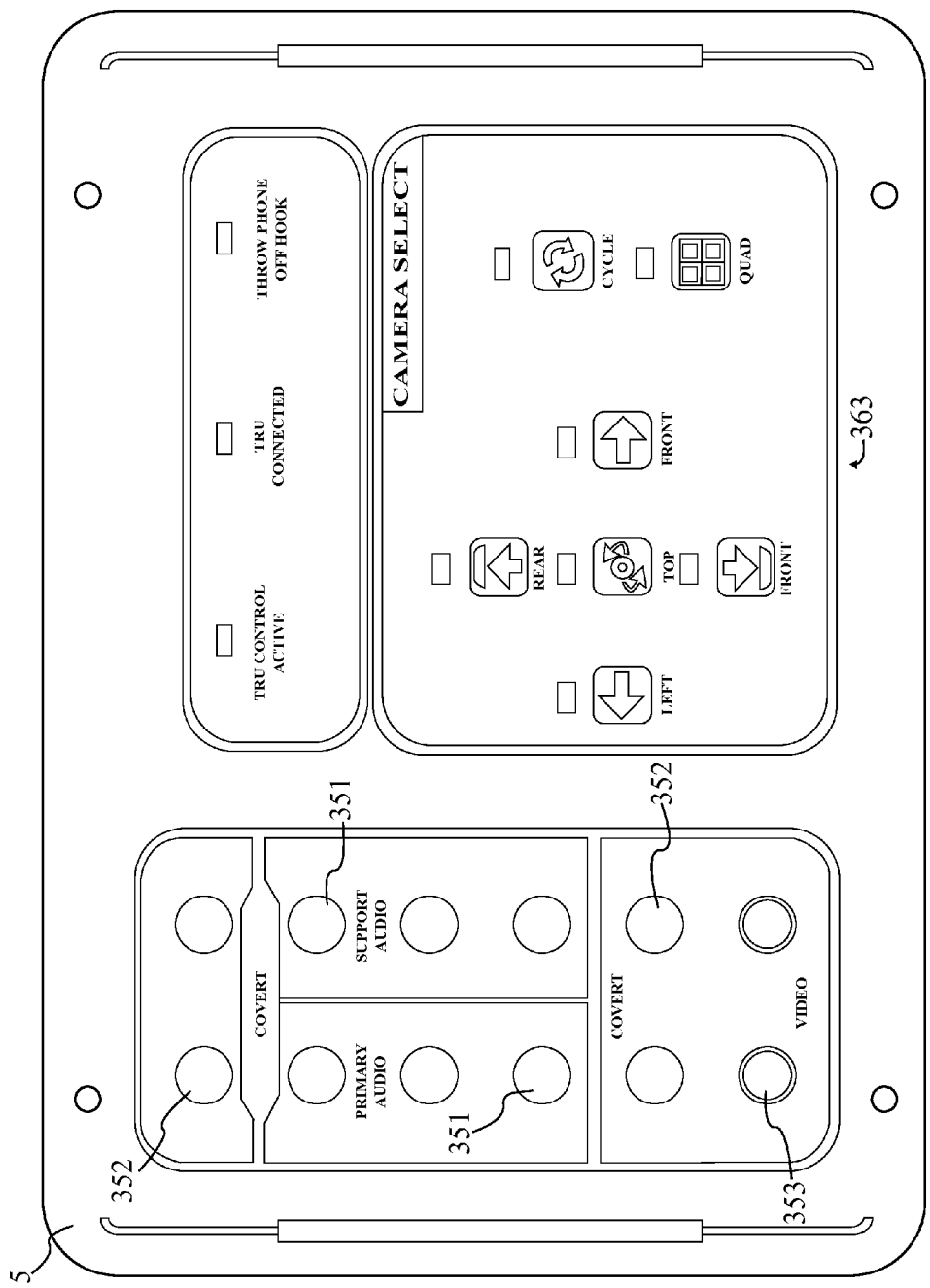
FIG. 10 is a drawing showing a possible construction of the auxiliary tactical module of the present invention.

While a preferred embodiment of the present invention has primarily been described to this point, there are a number of possible alternative embodiments that can be produced for the present invention. These may vary a number of aspects, such as construction materials, utilized wireless technologies, and tertiary features. For example, in a preferred embodiment a durable casing is provided for the remote unit 1, with cut-resistant sheathing being positioned around the communications cable 131. This helps to prevent damage, whether from wear-and-tear or intentional, to the remote unit 1. Durability is of a greater concern when the present invention is used for hostage negotiations, and thus such embodiments may choose to implement more rugged materials and construction specifications than embodiments designed for other purposes. The lengths of connecting cables can also vary with embodiments; in the preferred embodiment the communications cable 131 joining the remote unit 1 to the command unit 3 can go over five thousand feet, but in other embodiments the distance can be increased or decreased as is optimal for the specific application. Other specific features that can vary with embodiments include a purpose designed micro-controller firmware, digital video equalization, differential signal transmission, a dual audio switching matrix for use with the audio control panel 362, adjustable parameters for audio signal enhancement, a micro-controlled user interface bus, serial data control and communication, shielding against electromagnetic and radio interference, internal test ports for debugging and quality control, and a proprietary battery management system. Examples of possible constructions for the command unit 3, auxiliary audio-visual interface module 4, and auxiliary tactical module 5 are provided in FIG. 8, FIG. 9, and FIG. 10.

Other embodiments may also provide additional modules for connection to the command unit 3, taking advantage of the modular design of the present invention. Said additional modules can expand upon existing capabilities or introduce new capabilities as they are developed or made feasible by new and developing technology.

Although the invention has been explained in relation to its preferred embodiment, it is to be understood that many other possible modifications and variations can be made without departing from the spirit and scope of the invention as hereinafter claimed.

What is claimed is:

1. A modular advanced communication system comprises:
   a remote unit;
   the remote unit comprises a handset, a local area speaker, a remote unit data transfer port, an audio-visual recording system, and a first power supply;
   a plurality of accessory modules;
   the plurality of accessory modules comprises a voice-stress analysis module, a pulse monitoring module, and a fingerprint identification module;
   a command unit;
   the command unit comprises a command unit data transfer port, an at least one auxiliary data transfer port, a landline capture port, a plurality of audio-visual ports, a plurality of control panels, a charging port, and a second power supply;
   the remote unit data transfer port being communicably coupled to the command unit data transfer port;
   the handset, the local area speaker, and the audio-visual recording system being communicably coupled to the remote unit data transfer port;
   the command unit data transfer port being communicably coupled to the at least one auxiliary data transfer port;
   the handset, the local area speaker, and the audio-visual recording system being electrically connected to the first power supply; and
   the plurality of control panels and the charging port being electrically connected to the second power supply.

2. The modular advanced communication system as claimed in claim 1 comprises:
   the handset comprises a handset microphone, a handset speaker, and an infrared illumination source;
   the handset microphone and the handset speaker being communicably coupled to the remote unit data transfer port;
   the handset microphone and the handset speaker being electrically connected to the first power supply; and
   the infrared illumination source being mounted to the remote unit.

3. The modular advanced communication system as claimed in claim 1 comprises:
   the audio-visual recording system comprises a covert microphone and an at least one covert video camera;
   the covert microphone being housed within the remote unit;
   the at least one cover video camera being mounted within the remote unit;
   the covert microphone and the at least one covert video camera being electrically connected to the first power supply; and
   the covert microphone and the at least one covert video camera being communicably coupled to the remote unit data transfer port.

4. The modular advanced communication system as claimed in claim 1 comprises:
   the plurality of accessory modules further comprises a transcription module and a translation module;
   the pulse monitoring module and the fingerprint identification module being housed in the handset;
   the pulse monitoring module and the fingerprint identification module being electrically connected to the first power supply;
   the pulse monitoring module and the fingerprint identification module being communicably coupled remote unit data transfer port;
   the handset being communicably coupled to the voice-stress analysis module, the transcription module, and the translation module through the command unit data transfer port; and the voice-stress analysis module, the transcription module, and the translation module being communicably coupled to the handset and the audio-visual recording system through the at least one auxiliary data transfer port.

5. The modular advanced communication system as claimed in claim 1 comprises:
a communications cable;
a first end of the communications cable being connected to the remote unit data transfer port; and
a second end of the communications cable being connected to the command unit data transfer port.

6. The modular advanced communication system as claimed in claim 5 comprises:
the first end comprises a first connection verification circuit;
the second end comprises a second connection verification circuit;
the first connection verification circuit and the second verification circuit each comprise a status indicator;
the first connection verification circuit being electrically connected to the remote unit data transfer port, wherein the status indicator of the first connection verification circuit is electrically activated; and
the second connection verification circuit being electrically connected to the command unit data transfer port, wherein the status indicator of the second connection verification circuit is electrically activated.

7. The modular advanced communication system as claimed in claim 1 comprises:
the command unit further comprises an amplifier and a command unit intercom;
the plurality of audio-visual ports comprises an at least one-way audio port, an at least one two-way audio port, and an at least one one-way video port;
the at least one one-way audio port and the at least one two-way audio port being electrically connected to the command unit data transfer port through the amplifier;
the command unit intercom being communicably to command unit data transfer port and the at least one auxiliary data transfer port; and
the command unit intercom being electrically connected to the second power supply.

8. The modular advanced communication system as claimed in claim 1 comprises:
the plurality of control panels comprises a primary control panel, an audio control panel, a video control panel, and a communications control panel;
the audio control panel being communicably coupled to the plurality of audio-visual ports;
the video control panel being communicably coupled to the command unit data transfer port;
the communications control panel being communicably coupled to the landline capture port; and
the primary control panel, the audio control panel, the video control panel, and the communications control panel being electrically connected to the second power supply.

9. The modular advanced communication system as claimed in claim 1 comprises:
a device-pairing adapter;
the device-pairing adapter being electrically connected to the second power supply; and
the device-pairing adapter being communicably coupled to the landline capture port.

10. The modular advanced communication system as claimed in claim 9 comprises:

a digital-to-analog converter module being electrically connected to the landline capture port.

11. The modular advanced communication system as claimed in claim 9 comprises:
the device-paring adapter being wireless.

12. The modular advanced communication system as claimed in claim 1 comprises:
an at least one auxiliary audio-visual interface module;
the at least one auxiliary audio-visual interface module comprises an auxiliary audio-visual data transfer port, an audio-visual module intercom, and the plurality of audio-visual ports;
the plurality of audio-visual ports comprises an at least one one-way audio port, an at least one two-way audio port, and an at least one one-way video port; and
the at least one auxiliary data transfer port being communicably coupled to the audio-visual module intercom, the at least one one-way audio port, the at least one two-way audio port, and the at least one one-way video port through the auxiliary audio-visual data transfer port.

13. The modular advanced communication system as claimed in claim 1 comprises:
an at least one auxiliary tactical module;
the at least one auxiliary tactical module comprises an auxiliary tactical data transfer port, a tactical module intercom, the plurality of audio-visual ports, and the plurality of control panels;
the plurality of audio-visual ports comprises an at least one one-way audio port, an at least one two-way audio port, and an at least one one-way video port;
the plurality of control panels comprises a video control panel; and
the at least one auxiliary data transfer port being communicably coupled to the tactical module intercom, the at least one one-way audio port, the at least one two-way audio port, the at least one one-way video port, and the video control panel through the auxiliary tactical module data transfer port.

14. The modular advanced communication system as claimed in claim 13 comprises:
the at least one auxiliary tactical module further comprises an auxiliary tactical power supply, an auxiliary tactical charging port, and an integrated display;
a data storage module;
the integrated display being mounted onto the at least one auxiliary tactical module;
the data storage module comprises a non-volatile storage medium and a secondary display;
the secondary display being communicably coupled to the at least one one-way video port;
the command unit data transfer port being communicably coupled to the integrated display and the data storage module through the auxiliary tactical module data transfer port; and
the auxiliary tactical charging port, the integrated display, and the data storage module being electrically connected to the auxiliary tactical power supply.

15. The modular advanced communication system as claimed in claim 1 comprises:
a person-neutralizing module;
the person-neutralizing module being housed in the remote unit; and
the person-neutralizing module being electrically connected to the first power supply.

16. The modular advanced communication system as claimed in claim 1 comprises:

a secondary communications module; and
the secondary communications module being communicably coupled to the command unit.

* * * * *